March 22, 1932. S. R. ZIMMERMAN 1,850,905
VEHICLE LIFT
Filed March 19, 1929
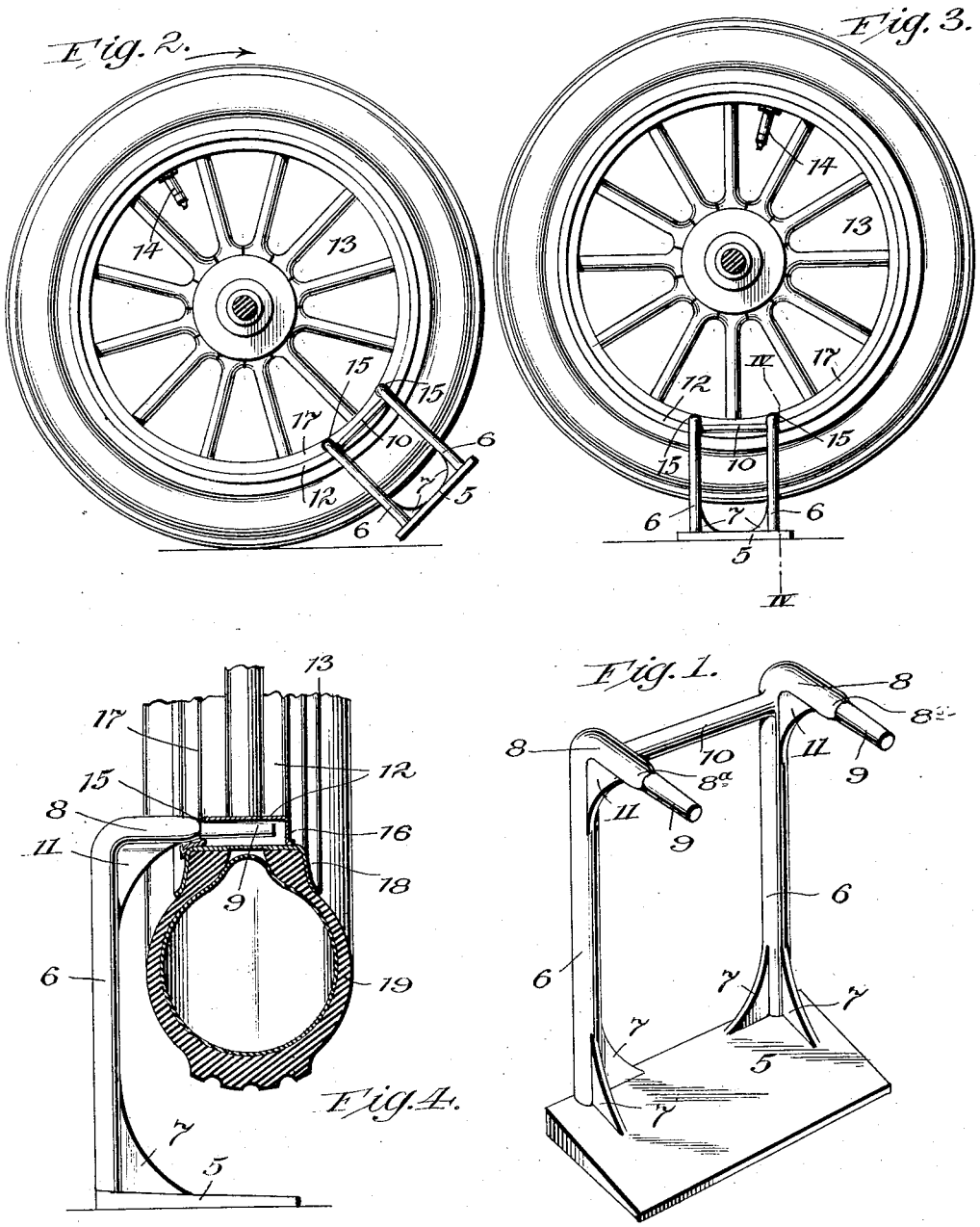
Inventor
Samuel R. Zimmerman
By Dodge
Attorneys.

Patented Mar. 22, 1932

1,850,905

UNITED STATES PATENT OFFICE

SAMUEL R. ZIMMERMAN, OF GREENVILLE, SOUTH CAROLINA, ASSIGNOR TO AUTO WHEEL LIFT CORPORATION, OF GREENVILLE, SOUTH CAROLINA, A CORPORATION OF SOUTH CAROLINA

VEHICLE LIFT

Application filed March 19, 1929. Serial No. 348,281.

My invention relates to vehicle lifts and particularly to lifts for raising a vehicle wheel from the ground by the power of the vehicle itself.

Among the objects of the invention may be stated, the provision of a lift which can be simply made, contains no working parts to get out of adjustment or repair, and one which can be applied to and removed from a wheel quickly without the necessity of reaching or crawling under the vehicle.

Another object is the provision of a lift which may be applied to a wheel without changing the appearance of the outside of the felly, and without perforating the outside face of the felly so as to allow dust and dirt to accumulate therein.

Other objects of the invention will appear from the following specification when read in conjunction with the accompanying drawings in which Fig. 1 is a perspective view of one form of lift embodying my invention;

Fig. 2 is a view showing the lift applied to a vehicle wheel prior to the lifting operation;

Fig. 3 is a view showing the lift in position after the wheel has been raised from the ground; and Fig. 4 is a sectional view through a vehicle wheel showing the relation of the parts of the lift and of the wheel.

As shown in Figure 1 the lift comprises a substantially flat base 5 having two spaced upstanding legs 6. The legs 6 are extended to form two spaced parallel prongs 8 having tapered shoulders 8a and reduced portions 9 in substantially parallel relation to the base 5, the reduced portions 9 also being tapered. The upstanding legs 6 are connected by a tie-rod or brace 10 and the prongs 8 and legs 6 are connected by reinforcing webs 11. The legs 6 are also provided with webs 7 which reinforce the connection between such legs and the base 5. Although the parts are here shown as being made integral such construction is not necessary as it is obvious that the base 5 and legs 6 may be formed as separate members secured together as by welding. It is also obvious that the brace 10 may be a separate member welded or brazed to the legs 6.

This lift is adapted not only to be furnished as a standard part of automobile equipment, but may be applied equally well to automobiles which are already in use, by drilling two small spaced holes in the inner face of the felly of each wheel. These holes 15 are preferably cut in the felly on the side of the wheel remote from the valve 14, so that when the wheel is raised from the ground the valve will be near the top of the wheel to facilitate the application or removal of the rim. By reference to Figure 4 it will be seen that the holes 15 are drilled on the inner flange only of felly 12, the outside flange 16 of this felly being entirely imperforate. These holes 15 pass through the flange 17 of felly 12 in such position that when the reduced portions 9 of prongs 8 are inserted into the felly these prongs are tangent to the inner cylindrical enclosed face of felly 12 and closely engage the same. The tapered form of shoulders 8a and portions 9 insures that these parts come into tight engagement with openings 15, and allows for slight variations in the size of the openings due to wear or otherwise. When the jack is in position the prongs 8 are wedged tightly into place with the tapered shoulders engaging the inner face of the felly so as to prevent relative movement between the felly and the prongs of the lift. The ends of prongs 8 extend practically through the channel portion of felly 12 and may, if desired, engage the inner face of flange 16 of this felly. When in position it will be seen that the central plane of the vehicle wheel is above the base 5 and is so related to such base that the vehicle is adequately supported.

Figures 2 and 3 are designed to show the manner of using the lift in connection with a modern form of vehicle wheel provided with demountable rims and fellies made of channel steel. In applying the lift to the wheel the vehicle is driven forward so that the two holes or sockets 15 in the felly are in a conveniently accessible position, and one in which a slight forward movement of the vehicle will cause the base 5 of the lift to engage the ground. For example, when the lift is applied to the wheel, as shown in Figure 2, and the vehicle is driven so as to rotate the wheel 13 in a clockwise direction, as shown by the arrow in Fig. 2, the base 5 will engage the ground and elevate the wheel until the entire weight of the vehicle supported by this wheel will be lifted. Upon slight further movement of the vehicle the base 5 will drop down to flat surface engagement with the ground as shown in Figure 3, at which time further movement of the vehicle is stopped. When this position is reached the jacking up process is completed and the vehicle tire and rim may be removed outwardly in the customary manner. It will be apparent from reference to Figure 4 that the legs 6 are in the rear of the wheel and out of the way of the operator so that the rim 18 together with the tire 19 may be removed without interfering in any way with the lift.

After the necessary repairs or replacements have been made and it is desired to lower the wheel, the vehicle is again driven forward causing the lift to rock on the base 5 which becomes tilted gradually until the tire again engages the surface of the ground. At this time further movement of the vehicle is stopped and the lift is removed from the wheel. The arrangement of the prongs 8 of this lift is particularly advantageous in that it positively prevents accidental or undesired disengagement of the lift from the wheel. For example, the lift cannot be removed by seizing one of the legs 6 because such a procedure would cause the two extensions 9 to wedge in the holes 15. The lift however may be simply and expeditiously removed by a gentle shaking or by seizing the two legs 6 one in each hand and pulling on them simultaneously.

I have shown this lift as applied to a felly composed of channel steel, but it is obvious that its use is not so limited as it may be applied equally well to wheels having wooden fellies or fellies of any other construction in which two small holes can be drilled so as to form sockets in the felly without weakening it appreciably.

All prior art devices of which I am aware require extensive alteration of the vehicle wheel for their application and also require that the openings in the felly extend entirely therethrough, so as not only to detract from the appearance of the vehicle and to afford a space for the accumulation of mud and dirt, but also to materially weaken the felly. My invention not only avoids all these disadvantages, but provides a lift which can be applied to both cars and used cars by a very simple drilling process. It also provides a lift which can be simply manufactured, is practically indestructible, and when used in connection with channel steel fellies is in tangent relation to the inner face of the felly so as to produce a strong and rigid connection between the lift and the vehicle wheel.

Although I have herein shown and described only one form of vehicle lift embodying my invention, it will be obvious that various changes and modifications may be made in the details thereof, within the scope of the appended claims, without departing from the spirit and scope of my invention.

What is claimed is:

1. A vehicle lift comprising a flat base, a pair of spaced legs secured to said base in angular relation thereto, a pair of spaced prongs having reduced portions at their free ends and secured to said legs, a brace connecting said legs substantially at the junction of said legs and prongs, said prongs extending substantially parallel to said base and adapted to cooperate with spaced sockets in the felly of a wheel, in a relation whereby said reduced portions enter into wedging engagement with the cylindrical face of the felly.

2. The combination with a vehicle wheel having two spaced sockets in the inner face of the felly and extending only partially therethrough, of a lift comprising a substantially flat base carrying two upstanding spaced legs, a pair of tapered prongs extending one from each of said legs and in substantially parallel relation to said base, and a brace connecting said legs, said prongs being adapted to cooperate with said sockets to secure the lift to the wheel, the tapered prongs exerting a wedging action against the cylindrical face of the felly.

3. The combination with a vehicle wheel having a felly of channel steel with two spaced openings in the inner face thereof, of a lift comprising two spaced tapered prongs adapted to enter said openings in tangent wedging relation to the cylindrical portion of said felly, a pair of spaced supporting legs connected to said prongs in angular relation thereto, and a substantially flat base secured to said legs in substantially parallel relation to said prongs.

4. The combination with a vehicle wheel having a felly of channel steel with two spaced openings in the inner flange thereof in tangent relation to the cylindrical enclosed face of the felly, of a lift comprising two spaced prongs having reduced portions adapted to enter said openings in tangent relation to the cylindrical enclosed face of the felly in wedging relation thereto, a substantially flat base, a pair of spaced legs connecting said prongs to said base, said base being substantially parallel to said prongs, and a brace connecting said legs in proximity to said prongs.

5. A vehicle lift adapted for cooperation with a vehicle wheel having spaced sockets in the inner face of the felly, said lift comprising a substantially flat base, wheel supporting means secured to said base in angular relation thereto, a pair of spaced prongs adapted to enter the sockets in the felly and extending from said supporting means substantially parallel, with said base, said prongs having means for engaging said felly to limit the distance the prongs may enter the sockets.

6. A vehicle lift adapted for cooperation with a vehicle wheel having spaced openings in the inner face of the felly, said lift comprising a substantially flat base, wheel supporting means secured to said base in angular relation thereto, a pair of spaced prongs extending from said supporting means and adapted to enter the openings in the felly, said prongs being shorter than the horizontal width of the felly and having means for engaging the felly to limit the distance the prongs enter the openings.

7. The combination with a vehicle wheel having two spaced openings in the inner face of the felly, of a lift comprising two spaced tapered prongs adapted to enter the openings in said felly and to wedge thereagainst, said prongs being shorter than the horizontal width of the felly, supporting means connected to said prongs and a substantially flat base secured to said supporting means in substantially parallel relation with said prongs.

In testimony whereof I have signed my name to this specification.

SAMUEL R. ZIMMERMAN.